July 16, 1935.  H. J. BYRNE  2,008,240
REGULATOR
Filed Nov. 2, 1931  2 Sheets-Sheet 2
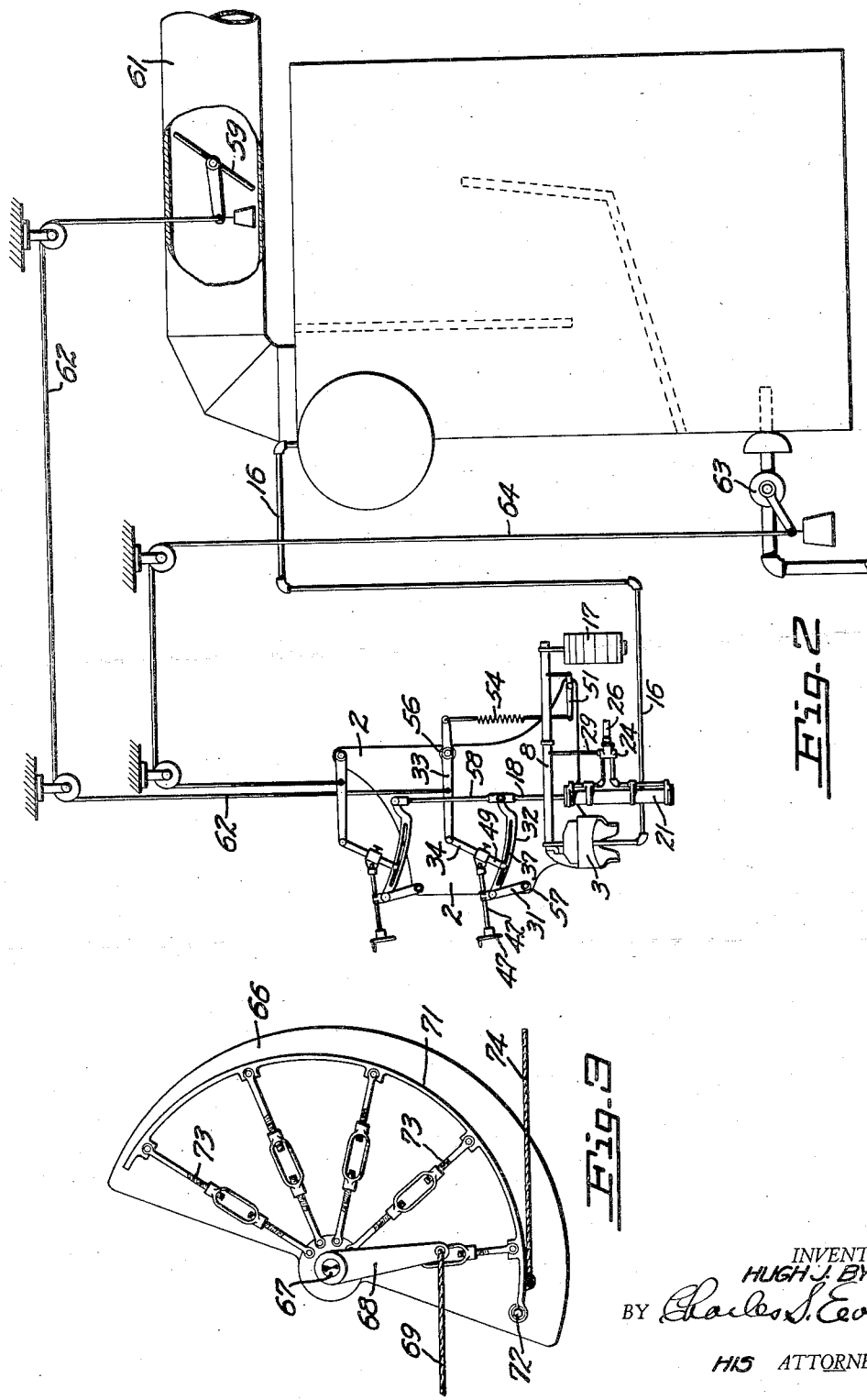
INVENTOR.
HUGH J. BYRNE.
BY
HIS ATTORNEY Patented July 16, 1935

2,008,240

UNITED STATES PATENT OFFICE 2,008,240

REGULATOR

Hugh J. Byrne, San Francisco, Calif.

Application November 2, 1931, Serial No. 572,635

15 Claims. (Cl. 236—16)

My invention relates to a regulator, and particularly to a regulator for controlling the action of movable elements, such as a boiler regulator for controlling the action of the air louvers, flue dampers and fuel valve of the boiler furnace.

It is among the objects of my invention to provide a regulator which operates to change the rate of movement of the element to be controlled relative to a control element.

Another object of my invention is to provide a regulator of the character described in which the rate changing means is actuated by the control element.

Still another object of my invention includes the provision, in a regulator of the character described, of adjustable means for selectively varying the rate of change between the movements of the elements.

A further object of my invention is to accomplish the above named objects by means of a simple cam arrangement.

A further and more specific object of my invention is to provide a boiler regulator which will operate to maintain a high efficiency of boiler operation over the entire range of its load.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 2 is a diagrammatic view showing a multiple unit regulator embodying my invention; a gas fired boiler being shown in conjunction with the regulator to illustrate the method of control.

Figure 3 is a side elevational view showing a modified form of regulator embodying my invention, adapted particularly for use in conjunction with an existing regulator.

Figure 1:
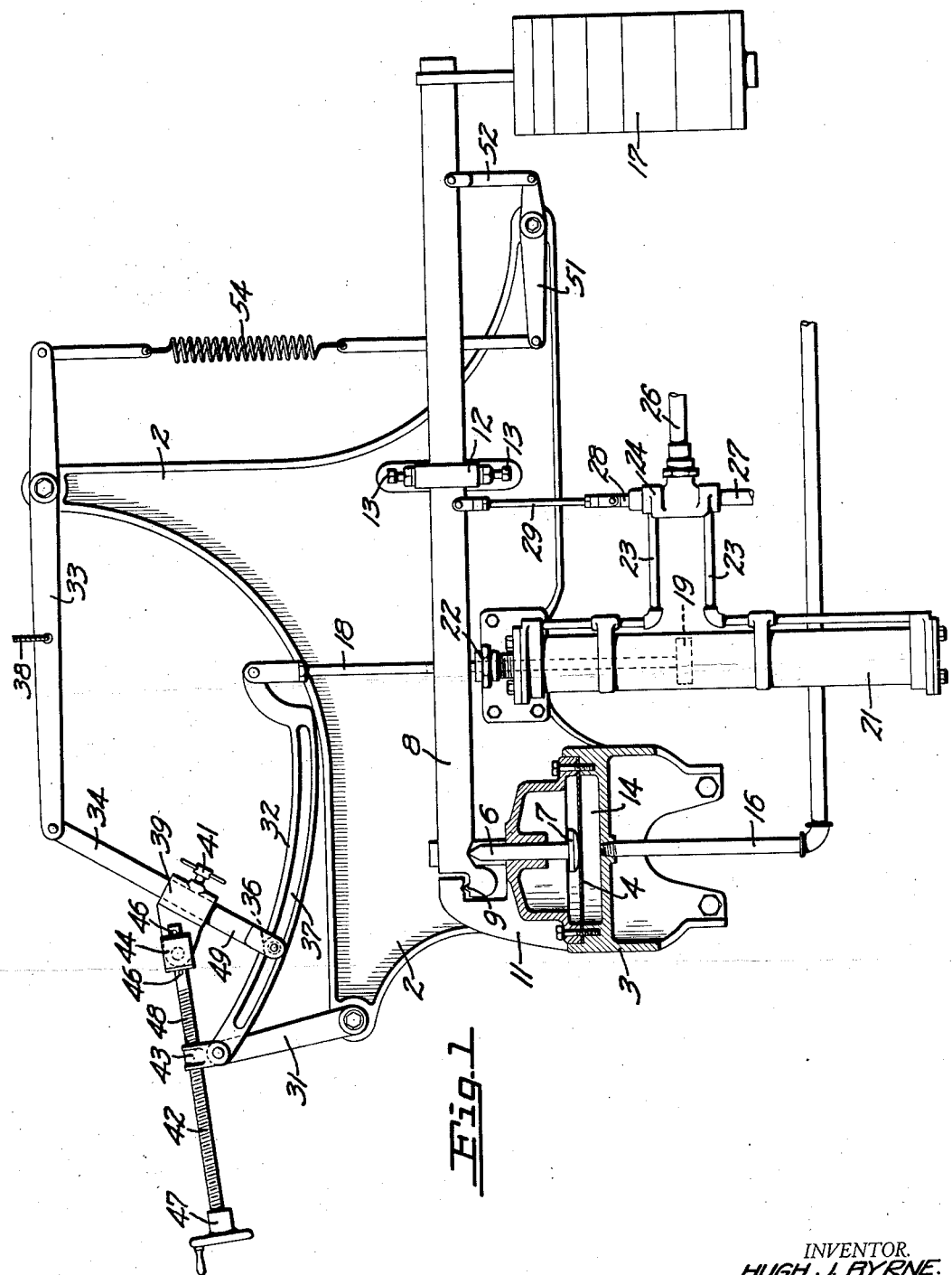
Figure 1 is a side view, partly in section and partly in elevation, showing a boiler regulator embodying my invention.

While a regulator embodying the principles of my invention has numerous applications, a typical example would be that of a boiler regulator for automatically controlling the operation of furnace air louvers, flue dampers and fuel valves to maintain a constant steam boiler pressure of any given value. Such a regulator has been chosen for purposes of description, but it is understood that the principles embodied in my invention may be incorporated for improving other types of regulators.

In good boiler operation it is desirable to maintain a practically uniform $CO_2$ content, or one which may be varied so as to effect the best combustion efficiency over the entire range of load. With the usual straight-line motion mechanism of automatic control it is practically impossible to obtain these results. For example, at 200% of boiler rating, the usual type of boiler regulators may be adjusted to control the damper, fuel value and air louvers so as to result in a predetermined $CO_2$ content in the flue gas, say for instance a $CO_2$ content of 11%; this percentage being desirable since it results in higher combustion efficiency.

When the load drops, however, the straight-line motion regulators inherently cannot operate to hold the $CO_2$ content at the desirable predetermined value, but allow the same to drop off to a lower value. For example, when the load drops to say 100% of boiler rating, the $CO_2$ content will fall off to a lower value, say in the order of 9%. This falling off in the $CO_2$ content is highly undesirable, because it results in a lower combustion efficiency.

The regulator embodying my invention overcomes the above mentioned difficulty, and operates to hold the $CO_2$ content at a desirable predetermined value over the entire range of load.

In terms of broad inclusion, the regulator embodying my invention operates to control the movement of an element, and comprises a movable control element, together with means connecting said elements for movement together. Means, interposed in the connecting means and actuated by the control element, is provided for changing the rate of movement of the element to be controlled relative to the control element, and means are also provided for selectively varying the rate of change between the movements of the element.

In the preferred form of my invention the means connecting the elements for movement together includes a linkage, and a cam, actuated by the control element, is interposed in the linkage for changing the rate of movement of the element to be controlled relative to the control element. Also, the means for selectively varying the rate of change between the movements of the elements is provided by an adjustable arrangement for changing the effective curvature of the cam.

When the regulator is used for controlling the movement of an element associated with a boiler, a pressure beam operably connected with the boiler is preferably provided, and the movable control element is actuated by the pressure beam.

Where there are a plurality of elements to be controlled associated with the boiler, means are provided connecting each of the elements to be controlled with the control element, and means are interposed in the connecting means for changing the rate of movement of each element to be controlled relative to the control element. Also, means are provided for varying the rate of change of selected controlled element movements relative to the movement of the control element.

In greater detail, and referring particularly to Figure 1, the boiler regulator embodying my invention comprises a frame 2 on which a pressure diaphragm housing 3 is suitably secured; the housing being preferably built up of two portions between which the pressure diaphragm 4 is securely held. A fulcrum pivot pin 6 is slidably mounted in the upper section of the pressure diaphragm housing, and carries a head 7 resting on the diaphragm 4.

A pressure beam 8 is pivotally mounted on the frame 2 and is positioned above the housing 3 so that the pin 6 provides a fulcrum therefor. The end of the pressure beam 8 adjacent the fulcrum pin 6 is provided with a fulcrum point 9 adapted to bear under a bracket 11 suitably secured on the frame 2. A guide bracket 12, also suitably secured on the frame 2, is provided for the pressure beam and carries a pair of set screws 13 for limiting the beam movement.

The chamber 14 formed between the pressure diaphragm 4 and the housing 3 communicates through a steam duct 16 with the boiler in conjunction with which the regulator is used. By this arrangement the pressure beam 8 moves in accordance with the conditions of pressure in the boiler. A weight 17 suspended at the outer end of the pressure beam serves as a counterbalance.

The movement of the pressure beam is utilized to actuate the control element 18 of the regulator. This control element is in the nature of a piston rod carrying a piston 19 slidably mounted in a hydraulic cylinder 21. The cylinder is suitably secured to the frame 2 and is provided with a gland 22 adjacent its upper end for receiving the piston rod.

Movement of the piston 19 is effected by water under pressure admitted to the ends of the cylinder through the ducts 23 connected with a pilot valve 24; this valve being adapted to admit the water optionally to either end of the cylinder while simultaneously opening the other end of the cylinder for exhaust. A pipe 26 connected with the valve 24 communicates with a suitable source of water under pressure, and another pipe 27, also connected with the valve, serves to carry off the waste water. The plunger 28 of the valve 24 is pivotally connected with the pressure beam 8 through a suitable rod 29.

When the pressure beam moves up or down from its normally horizontal position the valve plunger 28 operates to admit the water into either one or the other end of the cylinder 21. This causes the piston rod or control element 18 to slide up or down, depending upon the movement of the pressure beam 8. The above described mechanisms are old in the art of boiler regulators, and it is understood that their construction may be varied in any known or desirable manner. Also, any other construction that performs the same function may be employed.

Means including a linkage is provided for connecting the element to be controlled with the control element 18. The linkage comprises a rocker arm 31 pivotally mounted on the frame 2, and a cam arm 32 pivotally connected between the upper or free end of the rocker arm 31 and the upper end of the piston rod or control element 18. A lever 33 is also included in the linkage and is pivotally mounted on the frame 2, and a follower arm 34 is pivotally connected at one end to an end of the lever 33. The lower end of the follower arm 34 carries a roller 36 adapted to ride in the groove 37 of the cam arm 32. Motion from the lever 33 is transmitted to the element to be controlled, such as the air louver, fuel valve, or flue damper of the furnace, by a suitable cable 38.

A pivotal mounting is provided for the follower arm 34, and means are provided for adjustably positioning the mounting. For this purpose a block 39 is provided, adjustably slidable along the follower arm, and means, such as the clamp screw 41, is provided for locking the block in a selected position. A link is also provided, pivotally connected between the block 39 and the upper or free end of the rocker arm 31. This link connection preferably comprises a screw 42 threaded through a nut 43 pivoted on the end of the rocker arm. The inner end of the screw is journaled in a collar 44 which in turn is pivotally mounted on the block 39; a pair of pins 46 being provided in the screw 42 for holding the same against longitudinal movement through the collar.

The outer end of the screw 42 is provided with a hand wheel 47. By turning the hand wheel the length of the connecting link 48 between the block 39 and the upper end of the rocker arm 31 may be varied. Similarly, movement of the block 39 along the follower arm 34 operates to change the length of the arm portion 49 between the block and the cam 32. By varying these lengths the effective curvature of the cam 32 is changed.

As the control element 18 moves it causes the cam arm 32 to swing down or up, depending upon the movement of the pressure beam 8. This causes the lower end of the follower arm 34 to move toward or from the control element 18 at a varying rate, depending upon the length of the link 48 and follower arm portion 49. This movement of the follower arm 34 is transmitted to the element to be controlled through the lever 33 and cable 38.

For a given setting of the follower arm pivot mounting the cam arm 32 will have a selected curvature. The resulting cam action operates to change or increase the rate of travel of the element to be controlled relative to the control element. By changing the setting of the follower arm pivot mounting the effective curvature of the cam is changed to selectively vary the rate of change between the movement of the elements.

Means are provided in the regulator for preventing hunting. A lever arm 51 pivoted intermediate its ends is mounted on the frame 2 adjacent the pressure beam 8. A rigid link 52 is pivotally connected between one end of the lever arm and the pressure beam, and another link, including a tension spring 54, is pivotally connected between the other end of the lever arm and the lever 33 of the linkage system. By this arrangement tension is applied in the spring 54 from all movements of the pressure beam.

An arrangement for controlling the action of several elements of a furnace is accomplished by a multiple unit regulator, as shown in Figure 2. The regulator in this case is similar to that shown in Figure 1, except that in this case the second linkage is provided. In actual practice the two linkages will be placed side by side, both mounted on the pivot pins 56 and 57 and pivotally connected to the control element at the same point. For purposes of clarity however the linkages are shown one above the other with the control element provided with an extension 58 to actuate the cam arm of the upper linkage. One of the linkages is connected to operate a damper 59 in the flue 61 of the furnace by a cable 62. The other linkage is connected to control the opening and closing of a fuel valve 63 by a cable 64.

It will be noted from Figure 2 that weigths are connected at the ends of the levers to which cables 62 and 64 are attached, which levers are connected to move damper 59 and the fuel valve 63, respectively. Thus, tension is always placed on the linkage including cables 62 and 64; so as to provide for positive movement, without lag and immediately responsive to the movements of the cams. Furthermore, the construction of the cams and the fixed linkage connection thereto are such as to provide a positive actuated connection with the cables. In other words, the cables do not pass freely over the cams or ride over them. Consequently, slippage is prevented and the movements of the elements to be controlled will always be immediately responsive to that imparted by the cams.

By this arrangement, means, actuated by the control element, is provided for changing the rate of movement of a selected element to be controlled relative to the control element, and adjustable means are provided for selectively varying the rate of change of selected controlled element movements relative to the movement of the control element. In the boiler regulator shown the cam operates to increase the rate of movement of the controlled element over the movement of the control element, and the adjustment in the linkage operates to change the effective curvature of the cam to vary the rate of increase of selected controlled element movements over the movement of the control element.

This method of regulation for the various elements to be controlled permits an adjustment and results in a regulator action which will maintain a practically uniform $CO_2$ content, or one that may be varied so as to effect the best combustion efficiency over the entire range of load. For example, at 200% of boiler rating, the regulator may be adjusted to effect the damper, fuel value, and air louvers so as to result in a $CO_2$ content in the flue gas of 11%; this percentage being desirable for best combustion efficiency. When the load drops to say 100% of boiler rating, the regulator will operate the damper, fuel valve and air louvers to hold the $CO_2$ content at 11% value, thus maintaining the condition of best combustion efficiency.

Figure 3 shows a modified form of regulator embodying the principles of my invention. This regulator is adapted particularly for use in conjunction with existing boiler regulators, such as the usual type of straight-line motion control mechanisms. The device comprises a plate 66 mounted for rotation on a shaft 67. An arm 68 is also journaled on the shaft and is mounted for rotation with the plate 66. A cable 69 connects between the end of the arm 68 and the existing boiler regulator, so that movement in the regulator operates to rotate the plate 66. In this arrangement the cable 69 may be considered as the control element for my regulator.

A flexible band 71 is provided and is pivotally mounted at one end on the plate 66 by a suitable pivot pin 72. The band 71 is held in a curved position by means of a plurality of regularly extending arms 73 pivotally connected between the central portions of the plate 66 and the band 71. These arms are in the nature of turnbuckle rods, so that the length thereof may be adjusted to change the curvature of the flexible band 71. Thus, the band 71 forms a cam, and the arms 73 provide means for changing the curvature thereof. A cable 74 is secured adjacent the pivoted end of the band 71, so that the cable or flexible connector 74 normally engages along a portion of the curved surface of the cam or band 71. The cable 74 connects with an air louver, damper or other element to be controlled. In other words, the regulator embodying my invention as shown in Figure 3 is interposed in the cable connected between the existing boiler regulator and the element to be controlled.

When the existing regulator imparts movement to the cable 69 the control element operates to rotate the plate 66 and move the cam or curved band 71 into further engagement with the flexible connector 74. The degree of engagement of the cam with the connector depends upon the amount of rotation of the plate 66 by the existing regulator. The movement of the cam 71 into engagement with the flexible connector operates to change the rate of movement of the element to be controlled relative to the control element, and the particular shape of the cam serves to increase or accelerate the rate of movement of the controlled element. This rate of change between the elements, or rate of increase of the controlled element movement over the movement of the control element, is selectively varied by changing the curvature of the cam 71.

Thus an auxiliary regulator mechanism is provided for use with an existing regulator; which will provide an adjustment and result in a regulator action adapted for maintaining a practically uniform $CO_2$ content, or one which may be varied so as to effect the best combustion efficiency over the entire range of load.

I claim:

1. In a regulator for controlling the movement of an element, a movable control element, means including a linkage for connecting said elements for movement together, a cam interposed in said linkage and actuated by the control element, a follower arm riding on the cam and operatively connected in the linkage so that movement of the arm by the cam operates to change the rate of movement of the element to be controlled relative to the control element, a pivotal mounting for said arm, and means for adjustably positioning said pivotal mounting to change the effective curvature of the cam for selectively varying said rate of change between the movements of the elements.

2. In a rgeulator for controlling the movement of an element, a frame, a control element slidably mounted on the frame, a rocker arm pivotally mounted on the frame, a cam arm pivotally connected between the rocker arm and the control element, a lever pivotally mounted on the frame, a follower arm riding on the cam and pivotally connected to said lever, a block adjustably slidable on the follower arm, means for locking the block in a selected position, a link pivotally connected between the rocker arm and said block, means for varying the length of said connecting link, and means connecting said lever with the element to be controlled.

3. An apparatus of the class described, comprising a power plant having an air control member and a fuel supply control member, a regulator connected with said power plant and having a device movable responsive to a force condition created by said power plant, means including a cam connected to said device and to said air control member for effecting differential movement of said air control member with respect to the movement of said device, said cam comprising a rigid uninterrupted cam surface element and a rigid cam follower element both having a positive connection in said means, and a second means including a second cam connected to said device and to said fuel supply control member for effecting differential movement of said fuel supply control member, said second cam comprising a rigid uninterrupted cam surface element and a rigid cam follower element both having a positive connection in said second means, whereby both the damper and the fuel supply are positively controlled simultaneously and to the proper degree by the same force condition created by said power element.

4. An apparatus of the class described, comprising a power plant having an air control member and a fuel supply control member, a regulator connected with said power plant and having a device movable responsive to a force condition created by said power plant; means including a cam connected to said device and to said air control member for effecting differential movement of said air control member with respect to the movement of said device, said cam comprising a rigid uninterrupted cam surface element and a rigid cam follower element both having a positive connection in said means, a second means including a second cam connected to said device and to said fuel supply control member for effecting differential movement of said fuel supply control member, said second cam comprising a rigid uninterrupted cam surface element and a rigid cam follower element both having a positive connection in said second means, and means for effecting adjustment of the cam characteristics of each of said cams, by adjustably varying the relative displacement between said cam follower and said cam surface element.

5. An apparatus of the class described, comprising a power plant having a movable element to be controlled responsive to a force condition created by said power plant, a regulator connected with said power plant and having a member movable responsive to said force condition, a positive motion imparting connection between said element and said member, and an adjustable cam including a rigid uninterrupted cam surface part and a rigid cam follower part forming a part of and interposed in said connection for effecting differential movement between said member and said element.

6. An apparatus of the class described, comprising a power plant having a movable element to be controlled responsive to a force condition created by said power plant, a regulator connected with said power plant and having a member movable responsive to said force condition, a positive motion imparting connection between said element and said member, and a cam including a rigid uninterrupted cam surface part and a rigid cam follower part interposed in said connection for effecting differential movement between said member and said element, means for maintaining said parts in operative engagement, said cam forming a part of said connection with one of its parts connected positively to said member and another of its parts having a positive connection to said element.

7. An apparatus of the class described, comprising a power plant having a movable element to be controlled responsive to a force condition created by said power plant, a regulator connected with said power plant and having a member movable responsive to said force condition, and means for effecting positive differential movement between said member and said element; said means comprising a cam including a rigid uninterrupted cam surface part and a rigid cam follower part riding on said cam surface part, means for connecting said parts for movement therebetween, means for fixedly connecting one of said cam parts for movement by said regulator member, and a linkage fixedly attached to said element and to said other cam part.

8. An apparatus of the class described, comprising a power plant having a plurality of movable control means, the movements of which should be differential with respect to each other for best efficiency of said plant, a regulator connected with said power plant and having a device movable responsive to a force condition created by said power plant, positive motion imparting means for connecting each of said movable control means to said device whereby the movements of said plurality of movable control means are responsive to the same force condition created by said power plant, and an adjustable cam including a rigid uninterrupted cam surface element and a rigid cam follower element interposed in and forming a part of a connection between said device and one of said movable control means for effecting differential movement therebetween.

9. An apparatus of the class described, comprising a power plant having a movable element to be controlled responsive to a force condition created by said power plant, a regulator connected with said power plant and having an element movable responsive to said force condition, a positive motion imparting connection between said elements, and a cam forming a part of and interposed in said connection for effecting differential movement between said elements; said cam including a rigid uninterrupted cam surface part connected at one portion thereof to one of said elements, means for movably mounting said cam surface part at another portion thereof, a rigid cam follower part, and means for causing a portion of said cam follower part to ride on said cam surface part, another portion of said cam follower part being connected to the other of said elements.

10. An apparatus of the class described, comprising a power plant having a movable element to be controlled responsive to a force condition created by said power plant, a regulator connected with said power plant and having an element movable responsive to said force condition, a positive motion imparting connection between said elements, and a cam forming a part of and interposed in said connection for effecting differential movement between said elements; said cam including a rigid cam surface part having an opening therein and connected at one portion thereof to one of said elements, means for pivotally mounting said cam surface part at another portion thereof, a rigid cam follower part, and means for mounting a portion of said cam follower part for sliding movement in said opening of said cam surface part, another portion of said cam follower part being connected to the other of said elements.

11. In an apparatus of the class described, a regulator having a rigid movable member, a rigid cam surface part movably connected at one portion thereof to said member, means for movably mounting said cam surface part at another portion thereof, a rigid cam follower part, means for causing a portion of said cam follower part to ride on said cam surface part, an element to be controlled by said regulator, and a connection between another portion of said cam follower part and said element.

12. In an apparatus of the class described, a regulator having a rigid movable member, a plurality of rigid cam surface parts, each part being pivotally connected at one portion thereof to said member, means for movably mounting each cam surface part at another portion thereof, a rigid cam follower part complementing each cam surface part, means for causing a portion of each cam follower part to ride on the complementary cam surface part, a plurality of elements to be controlled by said regulator, and a connection between another portion of each cam follower part and each element.

13. In combination with a boiler, a regulator for controlling the elements affecting the air-fuel ratio of said boiler, a device and connections between a moveable member of said regulator and said elements for respectively effecting and transmitting differential movement betwen said elements to control said air-fuel ratio, said device containing a surface element and a contacting rider which move, one with respect to the other, to produce said differential movement, and means for causing said rider to continuously engage or contact said surface element, said means being a fixed mechanical connection between said surface element and said rider.

14. In combination with a boiler, a regulator for controlling the elements affecting the air-fuel ratio of said boiler, a device and connections between a moveable member of said regulator and said elements for respectively effecting and transmitting differential movement between said elements to control said air-fuel ratio, said device containing a surface element and a contacting pivotal rider which move, one with respect to the other, to produce said differential movement, and a fixed mechanical connection between said surface element and said rider to cause said rider to continuously engage or contact said surface element.

15. In combination with a boiler, a regulator for controlling the elements affecting the air-fuel ratio of said boiler, a device and connections between a moveable member of said regulator and said elements for respectively effecting and transmitting differential movement between said elements to control said air-fuel ratio, said device containing a surface element and a contacting rider which move, one with respect to the other, to produce said differential movement, a fixed mechanical connection between said surface element and said rider to cause said rider to continuously engage or contact said surface element, and means for adjustably varying the relative displacement between said rider and said surface element to adjustably vary said air-fuel ratio.

HUGH J. BYRNE.